United States Patent [19]

Simokat

[11] 4,403,115
[45] Sep. 6, 1983

[54] STATION IDENTIFICATION CIRCUIT ARRANGEMENT

[75] Inventor: Frank L. Simokat, Babylon, N.Y.

[73] Assignee: TII Industries Inc., Copiague, N.Y.

[21] Appl. No.: 308,276

[22] Filed: Oct. 5, 1981

Related U.S. Application Data

[62] Division of Ser. No. 143,137, Apr. 23, 1980.

[51] Int. Cl.³ .......................................... H04M 15/36
[52] U.S. Cl. .............................. 179/17 A; 179/18 FH
[58] Field of Search .............. 179/17 A, 17 R, 18 FA, 179/18 FH, 81 R, 81 A

[56] References Cited

U.S. PATENT DOCUMENTS

| | | | |
|---|---|---|---|
| 4,001,512 | 1/1977 | Proctor et al. | 179/18 FH |
| 4,056,690 | 11/1977 | Brolin et al. | 179/17 A |
| 4,209,667 | 6/1980 | Sinokat | 179/17 A |

Primary Examiner—Gerald L. Brigance
Attorney, Agent, or Firm—Martin Sachs

[57] ABSTRACT

A universal station identification circuit arrangement for use with central office equipment that utilizes either differential or longitudinal detection methods is adapted to be connected to the tip party's subscribers drop in a two-party line without requiring access to or rewiring of the tip party's telephone. The circuit arrangement may be fabricated in a single unit which includes a ringer isolator and ANI mark circuits. The ringer isolator and the ANI mark circuits may also be used individually.

15 Claims, 2 Drawing Figures

STATION IDENTIFICATION CIRCUIT ARRANGEMENT

This application is a division of application Ser. No. 143,137, filed Apr. 23, 1980.

BACKGROUND OF THE INVENTION

1. Field of the Invention

This invention relates to telephone system equipment that is used at the subscriber's end of a subscriber's line in conjunction with a telephone station, and in particular to a universal station identification circuit arrangement including a ringer isolator and ANI (Automatic Number Identification) mark circuits which are detected by central office equipment utilizing either differential or longitudinal detection methods.

2. Discussion of the Relevant Art

Ringer isolator circuits are used to eliminate electrical noise that results from ringer ground connections during the talking state of a telephone call while the called and the calling parties are connected to each other. This is accomplished by keeping the telephone ringer isolated or disconnected from ground except for the periods when a central office ringing signal voltage is applied to ring the telephone.

ANI mark circuits (also referred to as station identification circuits) are used with plural party lines to identify toll calls dialed by a selected party (customarily the tip party as distinguished from the ring party) for billing purposes in an automatic number identification system.

Prior to this invention, it has generally been the practice to wire ringer isolator and ANI mark circuits directly into the telephone sets. It also has been a custom to incorporate the ANI mark circuits into the telephone sets at the time of manufacture, but to make the circuit connections in such a way that the ANI mark circuits remain inactive or disabled until such time that it is desired to install the telephone at a tip party station on a two-party line.

Because of this custom, service calls are frequently needed when a telephone set is later assigned to a new or different subscriber for the purpose of converting the set in some cases to single party or ring party use and in other cases to tip party use. Many times existing telephones already installed are not equipped with ANI mark circuits. If conversion is required for tip party use, a service call is required, and physical access to the telephone is needed in order to make a modification to utilize a circuit arrangement which must be installed in the instrument itself. In addition, house calls are required to equip subscriber's telephones with the type of ringer isolator that is installed in the telephone itself.

In order to avoid the requirement of obtaining access to the physical telephone instrument, many circuits have been devised to provide the ANI mark equipment in such a way that it need not be physically housed in the instrument itself. One example of such an ANI mark circuit is shown in FIG. 2 of U.S. Pat. No. 4,001,512 issued to D. F. Proctor on Jan. 4, 1977. Another example of this type of circuit is disclosed in U.S. Pat. No. 4,054,942 issued to C. W. Chambers, Jr., on Oct. 18, 1977.

Both of these ANI mark circuits may be installed without requiring access to the subscriber's telephone. As a result no changes are required in the telephone itself or in the wiring to the telephone to divert the telephone station to tip party use on a two-party line.

The ANI mark circuits described in the above-mentioned patents, however, have serious drawbacks.

In both patents, for example, the circuits designs are such that insertion or line losses are created by electrical components which are connected in the subscriber loop itself in series with one or both of the different ring conductors. In patent No. 4,054,942 and in one of the embodiments of patent No. 4,001,512 there is the additional problem of electrical noise which is created by grounding one of the two subscriber line conductors (usually the tip conductor) through a resistor, but not the other conductor in the course of establishing the ground mark.

In another type of prior ANI mark circuit, the base-emitter junction of a bipolar transistor is connected across a resistor that is in series with the tip conductor of the tip party's drop, and the collector of the transistor is connected to ground through a resistor (usually 2.6 Kohms). With this circuit design, loop current flow in the tip party's loop circuit turns on the transistor to create a difference in the current flowing in the tip and ring conductors. The resulting current difference is sensed by ANI equipment in the central office. This ANI station identification circuit is referred to as the differential type and cannot be employed with the longitudinal type of identification in which a current path to ground is sensed at the central office to identify the calling party as the tip party.

Examples of prior ringer isolator circuits are described in U.S. Pat. No. 3,916,111 issued to H. W. Ott on Oct. 28, 1975, U.S. Pat. No. 3,303,289 issued to M. S. Hawley, et al on Feb. 7, 1967 and U.S. Pat. No. 3,230,316 issued to P. M. Hunt on Jan. 18, 1966.

These patented ringer isolator circuits for the most part are normally wired into the telephone set itself and therefore present a problem of obtaining access to the telephone to make the installation as mentioned earlier.

The present invention avoids the foregoing problems and drawbacks as well as offering additional advantages as will become apparent from the following summary and description.

SUMMARY OF THE INVENTION

The present invention provides a novel ringer isolator circuit capable of operating with reduced ringer voltages and a novel ANI mark or station identification circuit which may be used individually or combined into a common unit for connection to a subscriber's drop without requiring access to or rewiring of the subscriber's telephone. The unit containing the combined, electrically compatible ringer isolator and ANI mark circuits may also optionally include a station protector such as a gas tube arrestor. The present circuit arrangement is capable of being used with central office equipment that uses either differential or longitudinal detection methods for sensing the application of the mark signal which is sensed at the central office to identify the calling party as the tip party. The ANI mark circuit of this invention operates to apply a ground mark in response to any (each) interruption of loop current after the tip party's telephone is lifted off-hook to enable the central office equipment to sense the presence of a current path to ground and is compatible with central office equipment which utilizes either a differential or a longitudinal detection method.

When the differential detection method is used the ANI mark circuit arrangement provides a ground mark circuit responsive to the initial loop current flow when the tip party's telephone is lifted off-hook and enables a ground mark switching circuit to apply a tip-to-ground and ring-to-ground mark. The application of a balanced tip-to-ground mark and ring-to-ground mark through equal resistances is sensed by central office equipment utilizing a differential detection method. When a central office utilizes a longitudinal detection method generally −48 volts is either placed on the tip or tip and ring shorted together and the present circuit arrangement senses the loss of loop current and places a tip-to-ground mark completing a current path to ground wnhich is sensed by a central office utilizing a longitudinal detection method.

The ANI mark circuit of this invention is designed in such a way that practically no insertion or line losses or imbalances are introduced into the tip party's line. Furthermore, the ANI mark circuit of this invention operates to remove the differential ground mark during open loop dialing pulses to avoid distortion of the pulses.

With the foregoing in mind, a major object of this invention is to provide a novel ANI mark circuit which is not subject to the previously described disadvantages of prior ANI mark circuits and may be utilized with central office equipment utilizing either differential or longitudinal detection methods.

The ringer isolator circuit of this invention is an electronic switch having a pair of capacitors connected in a voltage doubler circuit which permits it to operate at reduced ringer voltages. The telephone ringer is connected to ground only upon sensing the presence of ringing voltage across the tip and ring sides of a telephone line. In the ringer isolator of this invention the central office ringing signal is rectified and voltage doubled via two diodes and two capacitors. The second capacitor is connected across a neon tube. When the voltage across the capacitor rises to preselected value, the neon tube is fired to emit light onto a light sensitive resistor. The light sensitive resistor thereupon feeds gate current to a Triac to turn the Triac on. The Triac is connected between the telephone ringer and ground so that when it turns on, it connects the ringer to ground.

One of the diodes utilized in the voltage doubling circuit is a zener diode that in addition to rectifying the incoming ringing signal, it protects the capacitor against fault voltages.

By AC coupling incoming ringing signals into the voltage doubling circuit of the ringer isolator, it is made non-polar (not polarity sensitive) and therefore cannot be used with superimposed four party ringing.

Another object of this invention is to provide a novel unit which incorporates a combined ringer isolator and an ANI mark circuit that is adapted to be connected outdoors to a subscriber drop without requiring access to or rewiring of the subscriber's telephone.

A further object of this invention is to provide a novel ANI mark circuit which applies a ground mark in response to the interruption of loop current after the tip party's telephone has been lifted offhook and also provides a mark in response to loop current flow when a party is lifted off-hook and which is utilizable with central office equipment that uses either differential or longitudinal detection methods.

Yet another object of this invention is to provide a novel ANI mark circuit which removes the differential ground mark during open loop dialing impulses to avoid distortion of the pulses.

A universal station identification circuit arrangement for use with central office equipment utilizing either differential or longitudinal detection methods for identifying a preselected one of two parties on a two-party line in a telephone system when a call is initiated from the preselected party's telephone, comprising first means for providing a first ground mark which is normally disconnected from the line when the preselected party's telephone is on-hook; second means responsive to the normal flow of loop current that is established by lifting the preselected party's telephone off-hook for causing the first means to apply the first ground mark to both the tip and ring conductors of the line; third means for providing a second ground mark which is normally disconnected from the line when the preselected party's telephone is on hook; and fourth means responsive to any momentary interruption of loop current that occurs after the flow of loop current is established by lifting the preselected party's telephone off hook for causing the third means to apply a second mark to the tip conductor of the line.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

DESCRIPTION OF THE PREFERRED EMBODIMENT

Figure 1:
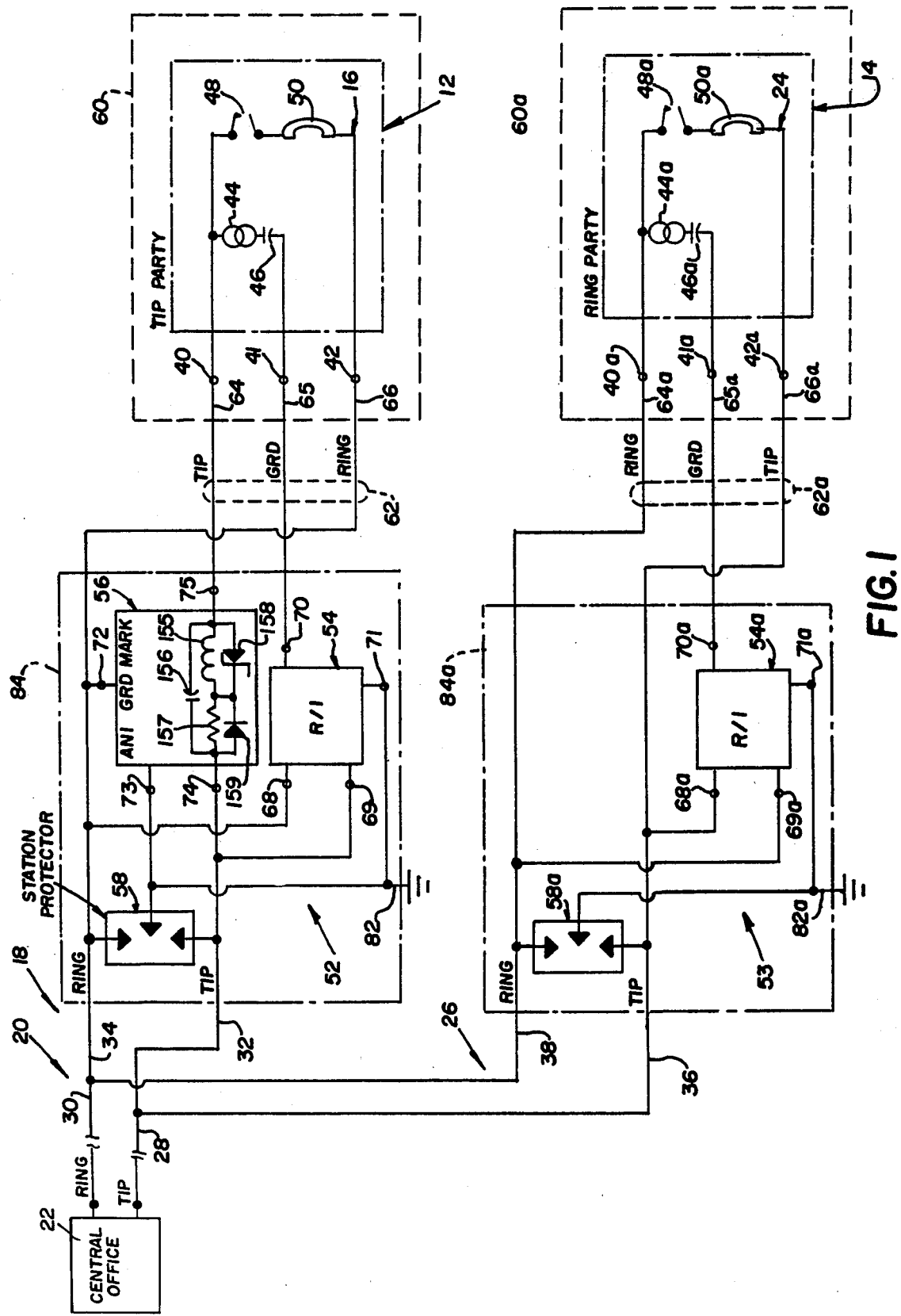
FIG. 1 is a schematic diagram of a two-party telephone system incorporating the principles of the present invention.

Referring now to the figures, and in particular to FIG. 1 where a two-party subscriber loop circuit incorporating the principles of the present invention is shown comprising a tip party telephone station 12 and the ring party telephone station 14.

The telephone set 16 and the tip party station 12 is connected by way of a subscriber's drop 18 (sometimes referred to as a drop wire) and a telephone or transmission line 20 to a central office 22. The telephone set 24 in the ring party station 14 is connected by a separate subscriber's drop 26 and line 20 to the central office 22.

The line 20 is common to telephone stations 12 and 14 and has tip and ring conductors 28 and 30 as shown. Drop 18 and line 20 combine to define a first subscriber's loop or line for the tip party; and drop 26 and line 20 combine to define a second subscriber's loop or line for the ring party.

Still referring to FIG. 1, the subscriber drop 18 has tip and ring conductors 32 and 34, respectively, which connect to the tip and ring conductors 28 and 30, respectively, on line 20. Likewise, drop 26 has tip and ring conductors 36 and 38, respectively, which connect to the tip and ring conductors 28 and 30 of line 20.

Telephone set 16 comprises a conventional three wire circuit having three terminals 40, 41, and 42 for making wiring connections to the plant or facility outside of the subscriber's dwelling. As shown, set 16 includes a ringer 44 and a capacitor 46 connected in series between terminals 40 and 41 and also a hook switch 48 and the handset 50 connected in series between terminals 40 and 42.

The ring party's telephone set 24 is the same as the tip party's telephone set 16. Like reference characters have therefore been applied to designate corresponding components of sets 16 and 24 except that the reference numerals for set 24 have been suffixed by the letter "a" to distinguish them from the reference numerals applied to set 16.

The tip and ring party's station units incorporating the principles of the present invention are respectively indicated at 52 and 53 in FIG. 1. The tip party unit 52 is connected to the subscriber's end of drop 18, and the ring party unit 53 is similarly connected to the subscriber's end of drop 26. In the preferred embodiment unit 52 comprises a ringer isolator 54 and an ANI group mark station identification circuit arrangement 56. A station protector 58 may optionally be included in unit 52 as shown. The station protector 58 may be a conventional three electrode gas tube surge arrestor such as the series TII-300 manufactured by the TII Corporation, Lindenhurst, N.Y.

Unit 52 is normally located outside of the tip party's home or building which houses telephone set 16 and which is schematically indicated in dashed lines at 60 in FIG. 1. Terminals 40 through 42 of telephone set 16 are connected by a three conductor station wire 62 to unit 52 in a manner to be described hereinafter.

As shown, the three conductors of the station wire 62 are indicated at 64, 65, and 66 in FIG. 1 and are respectively connected to terminals 40, 41 and 42. In this embodiment, the ringer isolator is provided with four operating terminals 68, 69, 70 and 71, and the ANI mark circuit 56 also has four terminals as indicated at 72, 73, 74, and 75.

As shown, the ring side or ring conductor 34 of drop 18 is connected to one end electrode of the gas tube surge protector 58, to terminals 68 and 72 and through conductor 66 to terminal 42. The tip side or tip conductor 32 of drop 18 is connected to the upper end electrode of protector 58, and to terminals 69 and 74.

In the ANI mark circuit 56 a series current conducting path is established between terminals 74 and 75 through a relay 155 and a resistor 157 connected in series. A zener diode 158 is connected in parallel with the relay 155 and an oppositly poled diode 159 is connected in parallel with resistor 157. A capacitor 156 is connected in parallel with the series connection of relay 155 and resistor 157 thus providing an AC and DC path to extend the tip side of the line. Conductor 64 conneccts terminals 75 to terminal 40 and conductor 65 connects terminal 41 to terminal 70. The center electrode of protector 58 and terminals 71 and 73 are all connected by a common ground wire 82 to earth ground.

With the circuit connections just described for the gas tube protector 58, the gas tube will fire when lightening or other induced surge occurs to cause both the tip and ring sides of drop 18 to become grounded through the gas tubes high conductivity ion path to the tubes center electrode which is connected to earth ground. The gas tube protector 58 may also be of a two element construction well known in the art.

In addition to being electrically combined or connected in unit 52 in the manner shown, protector 58, ring isolator 54 and the ANI mark circuit 56 may advantageously be incorporated into a common package or container which is schematically indicated at 84 in FIG. 1.

Alternatively, protector 58 may be located outside of unit 52 and container 84. With such an arrangement unit 52 will consist of ringer isolator 54 and the ANI mark circuit 56 and may be mounted at protector 58. In either case, unit 52, with or without protector 58, makes access to or rewiring of the station telephone 16 unnecessary.

Moreover, the ringer isolator 54 and the ANI mark circuit 56 may be used individually as separate components. As is apparent, access to or rewiring of the subscriber's telephone is also unnecessary when either the ringer isolator 54 or the ANI mark circuit 56 is used individually.

The ring party unit 53 is the same as the tip party unit 52 except that it does not have an ANI ground mark station identification circuit. Additionally, the circuit connections to the telephone set 24 and the ringer isolator in unit 53 differ as will be described in detail later on. To the extent that unit 53 is the same as unit 52, like reference numerals suffixed by the letter "a" have been applied to designate corresponding components of unit 53.

Figure 2:
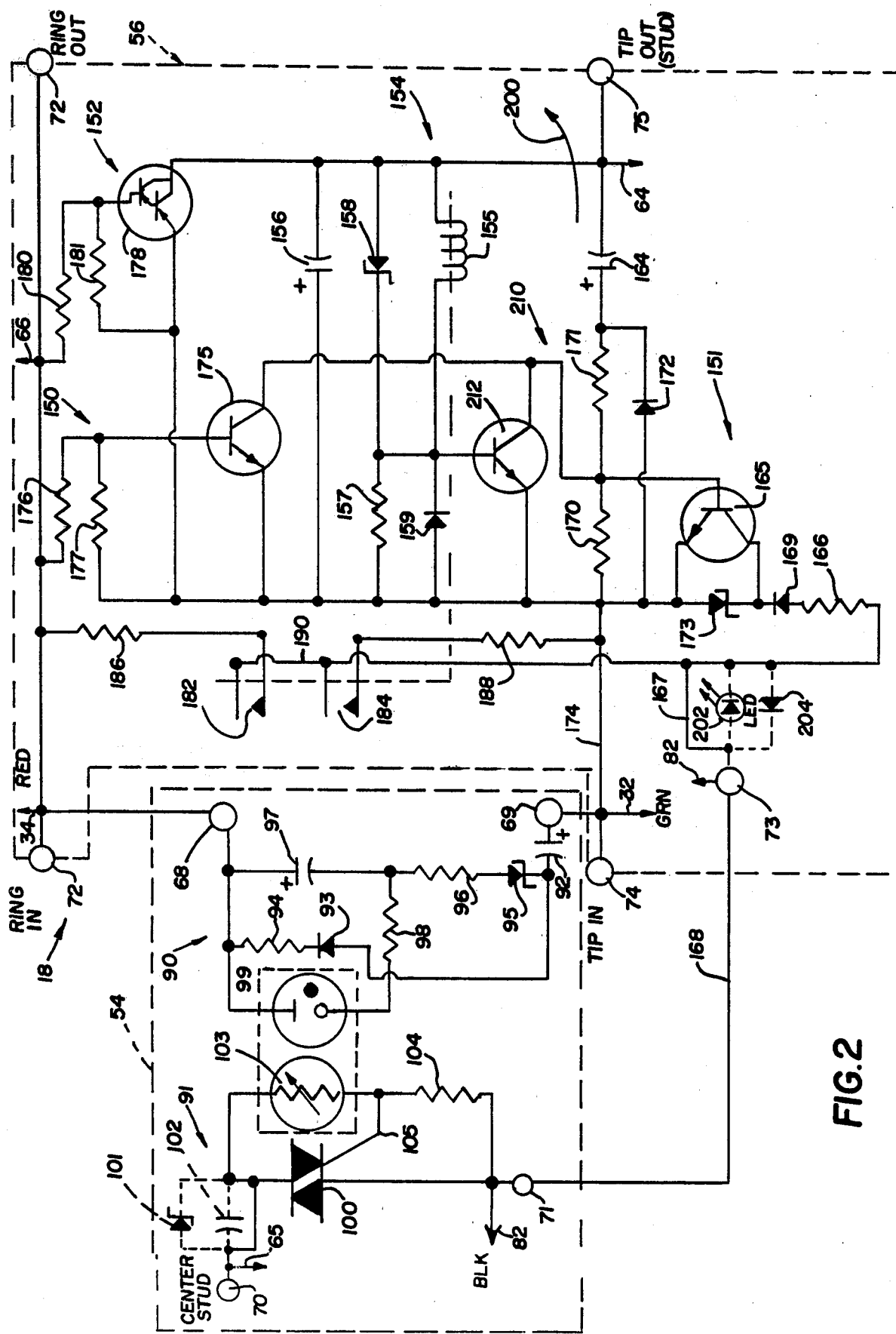
FIG. 2 is a schematic circuit diagram of the ringer isolator and the universal station identification circuit arrangement (ANI mark circuit) of the present invention.

Referring now to FIG. 2, ringer isolator 54 constitutes an electronic switch which senses the presence of ringing voltage and electrically connects the telephone ringer 44 to ground. To accomplish this, the illustrated embodiment of ringer isolator 54 is shown to comprise a pair of circuit arrangements 90 and 91 which are electrically isolated from each other in the sense that there is no metallic current conducting pair between them.

Circuit arrangement 90 includes a capacitor 92 connected in series with a diode 93 and a resistor 94 across terminals 69 and 68 of ringer isolator 54. A second series path between terminals 69 and 68 includes capacitor 92, zener diode 95, resistor 96 and capacitor 97. The cathode electrode of zener diode 95 and the anode electrode of diode 93 are both connected to capacitor 92. A resistor 98 and a two-terminal neon tube or bulb 99 are serially connected across capacitor 97. The circuit arrangement as described functions as a voltage doubler circuit so that voltage appearing across capacitor 97 will be approximately equal to the peak to peak AC voltage appearing across terminals 69 and 68 since diode 93 will conduct on one half of the AC cycle and diode 95 will conduct on the other half of the AC cycle. Circuit arrangement 91 includes a Triac 100 connected across terminals 70 and 71 of the ringer isolator 54. A zener diode 101 and a capacitor 102 connected in parallel as shown may be connected in series with the Triac 100 as will be explained hereinafter. A light-sensitive resistor 103 which is light coupled to tube 99 functions to control the gate current to Triac 103.

As shown, resistor 103 is connected in series with a resistor 104 of fixed resistance across the anode terminals of the Triac 100 with the gate electrode 105 of Triac 100 being connected to the juncture of resistors 103 and 104. When no light is directed on resistor 103 its resistance will be very high and effectively presents an open circuit. When light eminating from tube 99 impinges upon resistor 103 it becomes a relatively low resistance thereby supplying sufficient current into the gate electrode of Triac 100 turning it on (putting it in its conducting state).

From the description thus far it is clear that Triac 100 is connected in series with ringer 44, capacitor 46 and ground. When Triac 100 is in its non-conducting state and no light is directed onto resistor 103, the circuit between ringer 44 and ground will be open so that no current can be conducted through the ringer. When Triac 100 is turned on, it completes the circuit for ringing ringer 44 so that current (AC) will be conducted from ground to conductor 82 to Triac 100 conductor 65, ringer 44, capacitor 46, conductor 64, capacitor 156, and the tip side of drop 18 to tip conductor 28.

In unit 52 which includes the circuit arrangements of 54 and 56, terminal 68 is connected to ring conductor 34 and hence the ring side of line 20, while terminal 69 is connected to tip conductor 32 and hence tip of side of line 20 as previously spliced.

When it is desired to ring the tip party's telephone set 16, central office equipment grounds the ring conductor of line 20, applies a DC central office battery potential to the tip conductor of line 20 and applies an AC ringing signal voltage on the negative central office battery potential at the tip side of line 20. This is typically accomplished by connecting the central office ring generator (not shown) in series with the central office battery between the negative side of the battery and the tip conductor of line 20 at the central office. The ringing signal typically has a frequency of 20 Hz and a peak voltage of 140 volts (80 to 100 volts RMS).

For the above example of central battery voltage, the DC voltage applied across terminal 68 and 69 will therefore be minus 48 volts, tip-to-ring, with minus 48 volts on terminal 69 and 0 volts on terminal 68. Zener diode 95 will therefore be forward biased under negative going alternations of the ringing signal voltage and diode 93 will become forward biased on the positive alternations of the ringing signal voltage. Zener diode 95 will become reversed biased and non-conducting when the positive going alternation of the ringing signal voltage becomes positive. The zener potential of diodes 95 is selected to be high enough such that the positive portion of the ringing signals positive going alternations do not reach the zener potential to cause the zener diode to conduct in the reverse direction.

Diode 93 therefore rectifies incoming positive going ringing signal to feed rectified current to capacitor 92 thereby charging it. On the negative going incoming ringing signal diode 95 conducts charging capacitor 97 so that the voltage across capacitor 97 is equal to twice the voltage appearing across capacitor 92 and may approach 200 volts DC.

Capacitor 97 continues to charge until the voltage across the capacitors becomes high enough to fire the neon tube 99. The firing potential of the neon tube 99 is preselected at a value which is less than the voltage to which the capacitor 97 can charge. A suitable firing potential for neon tube 99 is about 80 volts.

When the voltage across capacitor 97 rises above the firing potential of neon tube 99, tube 99 fires to complete a discharge path for capacitor 97 through resistor 98 and to thereby conduct current from the charge stored on capacitor 97. Resistor 98 limits the current that is conducted through the neon bulb from capacitor 97.

Upon firing, neon tube 99 will remain in conduction and will conduct current throughout the positive and negative alternations of the ringing signal voltage.

The ringing signal is conventionally interrupted and thus supplied a burst by the central office equipment so that it will have the usual ringing and silent intervals. In the ringing interval the 20 Hz ringing signal will be applied to line 20 and in the silent interval it will be removed.

The neon tube 99 will fire near the beginning of each ringing interval, remain in conduction throughout the ringing interval and will become non-conductive after capacitor 97 discharges at the beginning of the ensuing silent interval. Neon tube 99 will therefore cycle on and off, being on or conducting in the ringing interval and being off or non-conducting for most of the silent interval.

When neon bulb 99 conducts, it directs light onto resistor 103 to reduce resistance of resistor 103 to a negligible value and to thereby enable gate current to be fed to Triac 100 for turning the Triac on. Because of the cyclic operation of neon bulb 99, Triac 100 will also cyclically turn off and on during application of the ringing signal voltage, being on for the ringing signals ringing interval and off for the ringing signals silent interval. Triac 100 will turn off in the silent interval because capacitor 46 blocks the flow of direct current which would sustain conduction of Triac 100 in absence of gate current flow.

Should Triac 100 fail to turn off because of DC being on the line, using a zener diode 101 and capacitor 102 in parallel and inserted in series with the Triac 100 as shown in FIG. 2, will permit the use of the DC biased voltage to insure that Triac 100 can be turned off.

During the ringing interval, the 20 Hz ringing signal current will therefore be conducted through the DC blocking capacitor 46 and ringer 44 in the tip party's telephone set 16 to ring the ringer. Zener diode 101 is for over voltage protection of capacitor 102.

From the foregoing description it is clear ringer isolator 54 keeps ringer 44 disconnected from the ground except during the time that the central office ringing signal voltage is applied to ring the tip party's telephone 16. As a result, any impedance imbalance that may be caused by connecting the telephone ringer or ringers to ground will not be present to cause objectionable noise currents to be transmitted along with any voice currents when the called and calling party's are interconnected. As is well known these noise currents may develop under conditions where the impedance to ground on the tip side of the transmission line is not equal to the impedance to ground on the ring side of the line. Such an impedance imbalance often occurs as a result of having more ringers connected to one side of the line than the other.

In order to ring the ring party's telephone 24 the central office operates to ground the tip conductor of line 20, to apply the ring trip battery potential to the ring conductor of line 20, and to superimpose 20 Hz ringing signal voltage on the negative battery potential at the ring conductor of line 20. This voltage condition for ringing the ring party's telephone 24 will not ring the tip party's telephone because no AC voltages appears across the tip party's ringer even though Triac 100 is turned on.

Referring back to FIG. 1, ringer isolator 54a is the same as ringer isolator 54 as previously mentioned and makes no difference if the terminals are reversed.

In the case of ringer isolator 54a, terminal 68a is connected to tip conductor 36, and terminal 69a is connected to ring conductor 38. Additionally, ringer 44a and capacitor 46a are connected between the grounding terminal 70a and the ring conductor 38 of drop 26 in order to provide the potential for ringing the ring party's ringer 44a.

From the foregoing it is clear that when the central office operates to ring the ring party's telephone 24, ground will be applied to terminal 68a and −48 volts with the superimposed ringing signal voltage will be applied to terminal 69a. The voltage applied to terminal 68a and 69a for ringing the ring party's telephone will therefore be the same as the voltage applied to terminals 68 and 69 for ringing the tip party's telephone. Ringer isolator 54a will therefore operate in the same manner as ringer isolator 54 to connect ringer 44a to ground for energizing the ring party's ringer. However, ringer 44a will not respond to the central office voltage for ringing the tip party because no AC voltage appears on line 38 which is the ring party's line.

As compared to previously described prior art ringer isolators, it will be appreciated that the ringer isolator of this invention has relatively few parts. The ringer isolator of this invention can therefore be packaged in a small container and is economical to manufacture.

The ANI mark circuit 56 (also called the tip party's station identification circuit) is shown to mainly comprise a longitudinal ground mark squelch circuit 150, a longitudinal control circuit 151, a differential squelch circuit 152 and a differential switching control circuit 154. The circuit arrangements as described above have been named for convenience to relate to the type of sensing utilized by the central office equipment. The longitudinal circuits will provide the ground mark with central office equipment utilizing the longitudinal method for interrogating a ground mark on the tip party line while the differential circuit arrangements will be utilized by central office equipment which determine the tip party utilizing differential sensing (interrogating) techniques. Briefly, the circuit arrangement of capacitor 164 and diode 172 is responsive to loop current flow when the tip party's telephone 16 is lifted off-hook to enable capacitor 164 to charge. When the central office lifts loop current off-line 20 (i.e., interrupts loop current) to interrogate the two-party subscriber loop circuit for the presence of a ground mark (i.e., the establishment of a current path to ground), circuit 151 operates on the discharge of capacitor 164 via resistors 170, 171, 157 and relay coil 155. The current discharge from capacitor 164 operates (turn on) a device (in this case a transistor 165) which causes a ground mark to be applied to the tip party's drop 18.

The ANI equipment in the central office senses the application of the ground mark (i.e., ground current path) to identify the calling party as the tip party and to provide the operation for billing the call to the tip party in the event that the dialed call is a toll call. Since the ring party has no ANI mark circuit, no ground mark will be applied to the ring party's subscriber drop or loop circuit when the ring party comes off-hook to initiate a call. Thus, when the central office equipment initiates a toll ticketing condition by lifting the loop current off-line 20, no ground mark will be sensed by the ANI equipment in the case where the ring party is making the call. As a result, the ANI equipment will identify the party making the call as the ring party and will operate to bill the ring party in the event that the call is a toll call. In this manner the party dialing the toll call will be identified for billing purposes.

Referring now in greater detail to FIG. 2, the ground mark switching circuit 151 which functions in cooperation with a central office automatic toll ticketing mechanism using a longitudinal sensing method comprises a ground mark resistance 166 which preferably is approximately 2.2 kOhms. One end of resistor 166 is normally connected to terminal 73 via a conductor 167. Terminal 73 in turn, is coupled to ground via a conductor 168 and conductor 82. Of course, if the ringer isolator circuitry 54 and the ANI station circuitry 56 are enclosed in a single package, the interwiring may be arranged in a more convenient manner. However, the functioning of the circuit connection will be the same as shown here. The other side of resistor 166 is connected to the anode electrode of diode 169. The cathode electrode of diode 169 is connected to the collector electrode of transistor 165. Transistor 165 functions as the longitudinal ground mark switch. The emitter electrode of transistor 165 is connected to the tip terminal 74 via a conductor 169.

Resistors 170 and 171 are connected in series with capacitor 164 between tip in terminal 74 and tip out terminal 75. A diode 172 has its anode electrode connected to the emitter electrode of transistor 165 and its cathode electrode connected to the juncture of resistor 171 and capacitor 164. Zener diode 173 has its anode electrode connected to the emitter electrode of transistor 165 and its cathode electrode connected to the collector electrode of transistor 165 providing protection for the emitter-collector junction of transistor 165 should an overvoltage occur thereat. The base electrode of transistor 165 is connected to the juncture of resistors 170 and 171.

The ground mark (the current path to ground) is provided between terminal 74 and ground and is therefore connected across and bridges the tip conductor to ground from the tip party's drop 32.

Under normal standby conditions with the handset 50 in its on-hook position, switch 48 is open preventing the flow of loop current. Transistor 165 will be in its non-conducting or high impedance state, therefore the mark (current path to ground) will be open and the ground mark will be removed.

When handset 50 is removed to the off-hook position, switch 48 closes and loop current will flow because of the −48 volts appearing on the ring line 34 which is connected to terminal 72. The tip line 32 connected to terminal 74 is placed at ground potential by the central office. Current will flow therefore from terminal 74 through diode 172 to charge capacitor 164 in a relatively short period of time. The voltage appearing across capacitor 164 is equal to approximately the voltage across zener diode 158 (2.7 volts). Upon interruption of the loop current by the central office, capacitor 164 will discharge via resistors 170, 171, 157 and relay coil 155, causing a positive bias voltage to go across resistor 170 thereby turning on (placing in a conductive state) transistor 165 thereby completing the mark current path from the cathode of diode 169 to the tip in terminal 74, thereby placing the mark resistance 166 from ground to the tip side of the line. This action is sufficiently fast to place a mark interdigitally which may be used for Stroger Automatic Toll Ticketing (SATT) ANI systems. By chosing the proper time constants of R and C the mark may be made to remain for as long as 300 miliseconds if required.

In order to insure that the mark circuit will permit current flow in only one direction through transistor 165, a diode 169 is placed in series with resistor 166 thereby further protecting transistor 165 from damage.

In order to prevent the mark from being placed from tip to ground during the ringing of the tip party by the central office coupling the ringing voltage to terminal 72, a squelch circuit 150 has been provided which includes transistor 175 which has its emitter electrode connected to the emitter electrode of transistor 165 and its collector electrode connected to the base electrode of transistor 165. A voltage divider network comprised of resistors 176 and 177 connected across terminals 72 (ring in) and terminal 74 (tip in). The base electrode of transistor 175 is connected to the juncture of resistors 176 and 177. Thus, when the AC ringing voltage goes positive on terminal 72 with respect to terminal 74 a positive bias is placed across the base-emitter electrodes of transistor 175 thereby causing transistor 175 to conduct (turn on). The conducting of transistor 175 causes a low resistance current flow path between its collector and emitter electrodes. Since the collector and emitter electrodes of transistor 175 are connected to the base and emitter electrodes of transistor 165 respectively, when transistor 175 turns on it causes a relatively low resistance path (short) between the base emitter junction of transistor 165 thereby changing it to a nonconducting state. With transistor 165 in a nonconducting (off) state the ground mark current path through resistor 166 and diode 169 is removed from the tip in terminal 74 as long as the voltage remains positive.

A squelch circuit 152 which functions to remove the differential ground mark which will be described hereinafter includes a darlington transistor 178, which has the collector electrodes thereof connected to terminals 75 (tip out) and the emitter electrode of the output transistor connected to terminal 74 (tip in). A voltage divider network which includes resistor 180 and 181 is connected across terminals 72 (ring out) and terminal 74 (tip in). The base electrode of darlington transistor 178 is connected to the juncture of resistors 180 and 181. The Darlington transistor 178 is of a PNP type so that a negative voltage appearing on terminal 72 with respect to terminal 74 will cause Darlington transistor 178 to turn-on (provide a low resistance path between the output transistor collector and emitter electrodes). Thus, on the negative going half cycle of the ringing voltage the Darlington transistor will turn on causing the voltage from terminal 75 (tip out) to terminal 75 (tip in) to essentially reduce to zero thereby preventing the charge to develop on capacitor 164, thus preventing the proper bias to occur and turn on transistor 165. Thus, during the ringing the ground mark path will be removed from the tip side of the line (terminal 74 to ground).

It is also to be noted that when the Darlington transistor 178 is turned on, it will prevent any voltage from appearing across capacitor 156 and thereby will prevent the differential ground mark from appearing across the ring and tip lines to ground, which will be further explained hereinafter.

In order to protect the circuitry from introducing additional noise during a central office battery reversal, which may occur when a call is completed, squelch circuit 210 is incorporated. Squelch 210 includes transistor 212 which has its collector and emitter electrodes connected across the base and emitter electrodes, respectively, of transistor 165. The reversal of current through resistor 157 biases transistor 212 to its on or conducting state thereby turning off transistor 165 and removing the longitudinal mark (resistor 166) from the line.

The circuit design for voltage dividers made up of resistors 176, 177 and resistors 180, 181 are made sufficiently large so that the parallel combination thereof is greater than one meghom. The voltage divider which includes resistors 180 and 181 for biasing Darlington transistor 178 is designed so that it will not cause Darlington transistor 178 to turn on until a negative voltage applied across terminals 72 and 74 (the tip and ring conductors) is equal to or greater than a preselected threshold such as, for example −15 volts. Darlington transistor 178 will therefore be forward biased when the central office grounds tip conductor 32 (terminal 74) and places the negative battery voltage of −48 on ring conductor 34 (terminal 72). However, Darlington transistor 178 will not be forward biased and will therefore be turned off when the tip party's telephone 50 is lifted off-hook to reduce the voltage across the tip and ring conductors 32 and 34 to some low value ranging from about −6 volts to −10 volts. Thus, during ringing both the ground marks are removed from the tip and ring lines and during dialing only the differential ground mark is removed.

In a typical crossbar central office switching system, the following sequence usually takes place to establish the toll ticketing condition after either one of the parties comes off-hook and before dial tone is supplied to the off-hook party. First, central office equipment will momentarily interrupt the loop current shortly after the party's telephone is lifted off-hook; shortly after, and while the loop current is still interrupted, the tip and ring conductors of line 20 are momentarily shorted together and the negative battery potential of −48 volts is applied by the central office to the interconnected tip and ring conductors. Some central offices permit the ring conductor of line 20 to float and will apply the negative battery potential to the tip conductor instead of shorting the tip and ring conductors together and applying the negative battery voltage to both conductors. The ANI mark circuit 56 works for both types of offices.

After shorting the tip and ring conductors of line 20 together and applying the negative battery potential to sense whether or not a ground mark has been applied, the central office crossbar system restores loop current to the calling party subscriber loop and supplies the dialing tone to the calling party to permit the calling party to commence dialing. The central office senses the ground mark during the toll ticketing condition and identifies the calling party as the tip party. If the central office fails to sense the ground mark, it identifies the calling party as the ring party. After the dial pulsing is completed the central office transmits the identity of the calling party to the Centralized Automatic Message Accounting (CAMA) equipment to provide for the billing of the toll call, if one was made, to the identified party.

The differential switching circuit 154 includes relay 155, capacitor 156, resistor 157, zener diode 158 and diode 159 as described earlier. The winding of relay 155 is connected in series with resistor 157, which preferably is a small value approximately 68 ohms, and they are connected between terminal 74 (tip in) and terminal 75 (tip out) as mentioned earlier. Relay 155 is provided with a pair of normally open contacts 182 and 184.

Contacts 182 and 184 are provided with a pair of equally sized resistors 186 and 188 respectively, as shown, resistor 186 is connected to terminal 72 (ring in) and resistor 188 is connected to terminal 74 (tip in) which places them in series across the tip and ring conductors 32 and 34 of the tip party subscriber drop 18 when the relay contacts are closed. Contacts 182 and 184 are connected between resistors 186 and 188 as shown, with the earth grounded terminal 73 connected to relay contact 190 which is common to both portions of the contacts 182 and 184, thereby grounding one end of resistors 186 and 188 when the relay contacts 182 and 184 are closed.

As explained earlier, during the idle condition of the line with −48 volts appearing on terminal 72 Darlington transistor 178 is in the on state causing a short across the series connection of relay coil 155 and resistor 157 therefore keeping the relay 155 in its normally opened condition and therefore not completing the circuit from terminal 72 and terminal 74 through resistors 186 and 188, respectively, to ground. During this idle time, capacitor 156 and capacitor 164 cannot be charged because no loop current is flowing in the tip party's drop 18 at this time.

When the tip party's telephone 16 is lifted off-hook to initiate a call, loop current will flow in the direction of arrow 200. The voltage across the tip and ring conductors 32 and 34 will therefore drop to a low value (e.g., 6 to 10 volts). As a result, the Darlington transistor 178 will turn off.

When Darlington transistor 178 turns off the short circuit across the winding of relay 155 and resistor 157 will be removed. Relay 155, however, will not energize immediately because capacitor 156, being at its discharge state will create a short accross the relay winding and resistor 157.

A short time after telephone 16 is lifted off-hook, capacitor 156 will be charged sufficiently to allow loop current to flow through the circuit branch containing the winding of relay 155 and resistor 157 to energize the relay. Contacts 182 and 184 will therefore close while the loop current is flowing to apply the ground mark through equal resistances (i.e., resistors 186 and 188, to the tip and ring conductors 32 and 34 of the tip party's drop 18).

Capacitor 156 will be charged by the flow of loop current to the voltage that is set by the zener potential of zener diode 158 or the voltage across the rely coil 155. When the central office interrupts the flow of loop current to initiate the previously described sequence to check for the presence of a ground mark, capacitor 156 only holds relay on while mark current flowing from the ring side of line flows through transistor 165 to hold the relay on. The discharge of capacitor 164 and hence the conductivity of transistor 165 may allow the relay to drop out long before the end of the interrogation interval. The holding of the relay is only a by-product of the longitudinal mark resistor 166 being connected.

The loop current is thereafter restored by the central office, relay 155 will be held in its energized state to keep the ground mark applied to the tip party's drop 18 up to the time of dialing. When the tip party's operating loop circuit is broken by dialing a number on telephone 16, the voltage on the tip and ring conductors 32 and 34 will be restored to their original idle state values (zero volts on tip and −48 volts on ring) for each break or open loop pulse.

As explained earlier, the Darlington transistor 178 will therefore turn on for each break portion in the dialing pulse train reapplying the short circuit across the winding of relay 155. For each dialing pulse break portion therefore relay 155 will be de-energized to open contacts 182 and 184 and to thereby remove the ground mark from the tip and ring conductors 32 and 34 throughout each dialing break portion. Any charges present on capacitor 156 at the beginning of each break portion, will discharge through the emitter and collector electrodes of the output Darlington transistor.

This rapid squelching operation avoids the dialing pulse distortion that would occur if the ground mark were not removed.

After dialing, the relay 155 will again be energized and capacitor 156 will be re-charged by loop current flow. In the present embodiment, therefore, the ground mark will remain on the tip and ring conductors 32 and 34 until telephone 34 is placed on-hook to open the subscriber loop circuit and thereby interrupt loop current flow. The differential ground mark is removed as soon as the tip party's telephone 34 is placed on-hook. As described, the ANI of the present invention is capable of operating for both differential and longitudinal systems.

As shown in FIG. 2 the conductor 167 may be replaced by LED (light emitting diode) 202 which is oppositely poled and connected in parallel with diode 204. Replacing conductor 167 with the parallel combinations of LED 202 and diode 204 permits the mark current path when applied to include the LED. Thus, when the mark current flows through LED 202 it will emit rays of light indicating to an observer that the mark is on during this period of time. Diode 204 protects the LED from reverse currents which may damage it.

Hereinbefore has been disclosed a universal station identification circuit arrangement which may be utilized with central office equipment using either differential or longitudinal detection methods for detecting the tip party on a two-party line. Also disclosed herein has been a novel ringer isolator circuit which may be utilized with ringer voltages of much lower values than heretofore known. It will be understood that various changes in the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. A universal station identification circuit arrangement for use with central office equipment utilizing either differential or longitudinal detection methods for identifying a preselected one of two parties on a two-party line in a telephone system when a call is initiated from the preselected party's telephone, comprising:
   (a) first means for providing a first ground mark which is normally disconnected from said line when sand preselected party's telephone is on-hook;
   (b) second means responsive to the normal flow of loop current that is established by lifting the preselected party's telephone off-hook for causing said first means to apply said first ground mark to both the tip and ring conductors of said line;
   (c) third means for providing a second ground mark which is normally disconnected from said line when said preselected party's telephone is on hook; and (d) fourth means responsive to any momentary interruption of loop current that occurs after the flow of loop current is established by lifting the preselected party's telephone off hook for causing said third means to apply said second mark to the tip conductor of said line.

2. A universal station identification circuit arrangement according to claim 1 wherein said fourth means applied said second mark with sufficient rapidity to be compatable with the Stroger Automatic Toll Ticketing (SATT) System for Automatic Number Identification (ANI).

3. A universal station identification circuit arrangement according to claim 1 wherein said second means includes a circuit arrangement for preventing said first means from applying said first mark to said tip conductor during the occurrence of open loop dialing pulses that are transmitted from said selected party's telephone.

4. A universal station identification circuit arrangement according to claim 1 wherein said fourth means comprises:

(a) a capacitor;
(b) means for charging said capacitor with loop current flowing in the preselected party's subscriber drop when the flow of loop current is initiated by lifting the preselected party's telephone off hook to provide a charge on said capacitor before a momentary interruption of loop current occurs;
(c) current-conducting means; and
(d) means for discharging current for said capacitor through said current-conducting means when any momentary interruption occurs in the loop current after the preselected party's telephone is off hook to initiate a call; and
(e) means under the control of said current-conducting means for coupling said second mark to at least the tip conductor of the line connecting said selected party's telephone to said central office whenever said capacitor discharges through said current-conducting means.

5. The universal station identification circuit arrangement according to claim 4 wherein said means for charging said capacitor comprises circuit means that normally provides a low impedance circuit path across said capacitor to discharge charge and prevent charging of said capacitor when said selected party's telephone is on-hook to prevent the flow of loop current in the preselected party's subscriber drop, said circuit means being responsive to the flow of loop current that is initiated by lifting said selected party's telephone off-hook to break said low impedance path and to thereby allow said capacitor to be charged by said loop current.

6. The universal station identification circuit according to claim 5 wherein said circuit means is connected across the tip and ring conductors of said preselected party's subscriber drop.

7. The universal station identification circuit according to claim 6 wherein said circuit means includes:

(a) a plurality of transistors;
(b) a biasing circuit arrangement connected to said transistors for forward biasing said transistors only when the central office battery voltage across the tip and ring conductors of said preselected party's subscriber drop is above a preselected threshold that is greater than the DC voltage that appears across the tip and ring conductors of said preselected party's subscriber drop when loop current is flowing in the preselected party's subscriber drop; and
(c) means for connecting the emitter and collector electrodes of one of said transistors across said capacitor such that when said transistors are forward biased, said low impedance path across said capacitor is established.

8. A universal station identification circuit arrangement according to claim 4 wherein said current conducting means includes relay winding means and wherein said means under the control of said current conducting means includes a set of contacts operated by the flow of current through said winding means to complete a current conducting path between earth ground and at least the tip conductor of the preselected party's subscriber drop to establish said second mark.

9. A universal station identification circuit arrangement according to claim 8 wherein said winding means is connected in series with a diode, said diode and winding means being connected in series with one of the tip or ring conductors of the preselected party's subscriber drop, and wherein said capacitor is connected in parallel with said diode and winding means.

10. A universal station identification circuit arrangement according to claim 9 including means for establishing a low impedance current path across said diode and said winding means connected in series to prevent current from being conducted therethrough whenever the DC across the tip and ring conductors of said preselected party's subscriber drop is at a value that exists when the preselected party's telephone is on hook, said low impedance current path establishing means being effective to open said path to permit current to be conducted through said control means in response to the reduction that takes place in the DC voltage across the tip and ring conductors of the preselected party's subscriber drop when the preselected party's telephone is lifted off hook to initiate the flow to loop current.

11. A universal station identification circuit arrangement according to claim 4 wherein said current conducting means includes transistor means and wherein said means under the control of said current conducting means includes a resistor and a diode connected in series to complete a current conducting path between earth ground through the emitter and collector electrodes of said transistor means and the tip conductor of the preselected party's subscriber drop to establish said second ground mark.

12. A universal station identification circuit arrangement according to claim 4 further including means for indicating when said current conducting means completes said current conducting path between earth ground and said tip conductor of the preselected party's subscriber drop to establish said first or second ground mark, said indicating means being serially connected in said current conducting path.

13. A universal station identification circuit arrangement according to claim 12 wherein said indicating means includes a diode and a light emitting diode connected in parallel and oppositely poled, said light emitting diode permitting current flow therethrough and emitting light therefrom when said current path to establish said first or second ground mark is established.

14. A universal station identification circuit arrangement according to claim 4 wherein said current conducting means includes means for preventing said current conducting means from conducting during the application of ringing voltage.

15. A universal station identification circuit arrangement according to claim 11 wherein said current conducting means includes a second transistor means connected to said transistor means for preventing said transistor means from conducting during the application of ringing voltage.

* * * * *